US010816675B2

(12) United States Patent
Yoshino

(10) Patent No.: US 10,816,675 B2
(45) Date of Patent: Oct. 27, 2020

(54) COORDINATE OUTPUT METHOD AND COORDINATE OUTPUT DEVICE

(71) Applicant: PANASONIC INTELLECTUAL PROPERTY MANAGEMENT CO., LTD., Osaka (JP)

(72) Inventor: Kazuyuki Yoshino, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 199 days.

(21) Appl. No.: 16/076,560

(22) PCT Filed: Feb. 7, 2017

(86) PCT No.: PCT/JP2017/004300
§ 371 (c)(1),
(2) Date: Aug. 8, 2018

(87) PCT Pub. No.: WO2017/138502
PCT Pub. Date: Aug. 17, 2017

(65) Prior Publication Data
US 2019/0049594 A1 Feb. 14, 2019

(30) Foreign Application Priority Data
Feb. 12, 2016 (JP) .................. 2016-024931

(51) Int. Cl.
*G01S 19/44* (2010.01)
*G01C 21/16* (2006.01)
(Continued)

(52) U.S. Cl.
CPC ............. *G01S 19/44* (2013.01); *G01C 21/16* (2013.01); *G01S 19/426* (2013.01); *G01S 19/45* (2013.01); *G01S 19/47* (2013.01); *G01S 19/49* (2013.01)

(58) Field of Classification Search
CPC combination set(s) only.
See application file for complete search history.

(56) References Cited

U.S. PATENT DOCUMENTS 6,484,098 B1 * 11/2002 Takemura ............... G01S 19/22
342/357.25
2010/0048140 A1 2/2010 Tajima et al.
(Continued)

FOREIGN PATENT DOCUMENTS

JP 2004-264182 9/2004

OTHER PUBLICATIONS

Official Communication issued in International Pat. Appl. No. PCT/JP2017/004300, dated Apr. 25, 2017.
(Continued)

*Primary Examiner* — Mamadou L Diallo
(74) *Attorney, Agent, or Firm* — Greenblum & Bernstein, P.L.C.

(57) ABSTRACT

There is provided a coordinate output method capable of suppressing the influence of a positioning error (jump) of a float solution in a case where interferometric positioning by RTK method is applied to positioning of a moving body. Current coordinates of a moving body are estimated based on previous coordinates of the moving body and information on a speed of the moving body. In addition, interferometric wave positioning is executed based on the positioning data of a base station and the positioning data of a positioning station to calculate the current coordinates of the moving body as either a fix solution or a float solution. In a case where the fix solution may not be calculated after the fix solution is calculated for a predetermined time or more, the coordinates of the moving body estimated from the information on a speed are output.

9 Claims, 9 Drawing Sheets

(51) Int. Cl.
*G01S 19/45* (2010.01)
*G01S 19/49* (2010.01)
*G01S 19/42* (2010.01)
*G01S 19/47* (2010.01)

(56) References Cited

U.S. PATENT DOCUMENTS

| | | | |
|---|---|---|---|
| 2011/0187590 A1* | 8/2011 | Leandro | G01S 19/40 342/357.27 |
| 2016/0273930 A1* | 9/2016 | Wada | G01C 21/3626 |
| 2018/0074201 A1* | 3/2018 | Sakai | G01S 17/06 |
| 2018/0245924 A1* | 8/2018 | Ishigami | G01C 21/165 |

OTHER PUBLICATIONS

The Extended European Search Report dated Jan. 30, 2019 for European Patent Application No. 17750225.9.

* cited by examiner

COORDINATE OUTPUT METHOD AND COORDINATE OUTPUT DEVICE

TECHNICAL FIELD

The present disclosure relates to a coordinate output method and a coordinate output device for outputting coordinates of a moving body.

BACKGROUND ART

In the related art, in order to measure an object in a stationary state with high accuracy, interferometric positioning by Real Time Kinematic (RTK) method is used. It is expected that high precision positioning of the moving body is realized by applying the interferometric positioning by the RTK method to the positioning of the moving body.

For example, PTL 1 discloses a moving body position measuring device using a global positioning system (GPS) receiver of the RTK system. In this device, usually, automatic traveling is performed based on the position and orientation of the moving body specified from the GPS data, but in a case where the reception state of the GPS data is not good, automatic traveling is switched to inertial navigation by a gyroscope and a vehicle speed sensor or the like.

CITATION LIST

Patent Literature

PTL 1: Japanese Patent Unexamined Publication No. 2004-264182

SUMMARY OF THE INVENTION

The present disclosure provides a coordinate output method capable of suppressing the influence of a positioning error (jump) of a float solution in a case where interferometric positioning by RTK method is applied to positioning of a moving body.

The coordinate output method in the present disclosure includes estimating current coordinates of a moving body based on previous coordinates of the moving body and information on a speed of the moving body, calculating the current coordinates of the moving body as either of a fix solution or a float solution by executing interferometric wave positioning based on positioning data of a base station installed at a predetermined point and positioning data of positioning station placed on the moving body, outputting the current coordinates of the moving body calculated as the fix solution in a case where the current coordinates of the moving body are calculated as the fix solution, determining a time during which the current coordinates of the moving body have been calculated as the fix solution, and outputting the current coordinates of the moving body estimated from the information on the speed in a case where a time during which the current coordinates of the moving body have been calculated as the fix solution is equal to or more than a predetermined value and in a case where the current coordinates of the moving body are not calculated as the fix solution.

In addition, the coordinate output device according to the present disclosure includes a processor, a storage, and an output unit, in which the processor estimates current coordinates of a moving body based on previous coordinates of the moving body and information on a speed of the moving body, calculates the current coordinates of the moving body as either of a fix solution or a float solution by executing interferometric wave positioning based on positioning data of a base station installed at a predetermined point and positioning data of positioning station placed on the moving body, outputs the current coordinates of the moving body calculated as the fix solution to the output unit in a case where the current coordinates of the moving body are calculated as the fix solution, determines a time during which the current coordinates of the moving body have been calculated as the fix solution to record the time in the storage, and outputs the current coordinates of the moving body estimated from the information on the speed to the output unit in a case where a time during which the current coordinates of the moving body have been calculated as the fix solution is equal to or more than a predetermined value and in a case where the current coordinates of the moving body are not calculated as the fix solution.

The coordinate output method and the coordinate output device according to the present disclosure are effective for suppressing the influence of a positioning error (jump) of the float solution in the case of applying the interferometric positioning by the RTK method to the positioning of the moving body.

DESCRIPTION OF EMBODIMENTS

Embodiments will be described in detail below with reference to drawings as appropriate. However, the detailed description may be omitted more than necessary. For example, there are cases where a detailed description of well-known matters and redundant description on substantially the same configuration may be omitted. This is for avoiding unnecessary redundancy of the following description and facilitating understanding by those skilled in the art.

The accompanying drawings and the following description are provided to enable those skilled in the art to fully understand the present disclosure and are not intended to limit the claimed subject matters.

Embodiment 1

The following is a description of Embodiment 1 with reference to FIGS. 1 to 7.

[1-1. Configuration]

Figure 1:
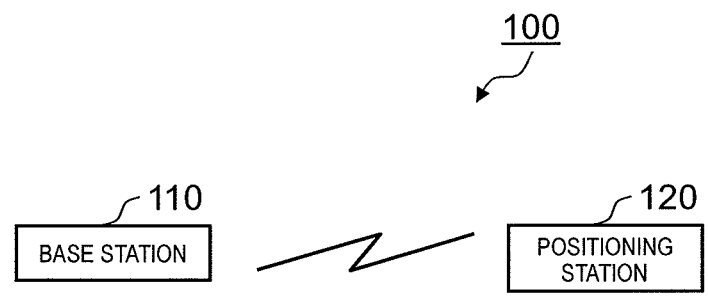
FIG. 1 is a conceptual diagram of a positioning system in Embodiment 1.

FIG. 1 is a conceptual diagram of a positioning system in Embodiment 1. Positioning system 100 includes base station 110 and positioning station 120. Base station 110 is installed at a place where coordinates on the Earth are known. Positioning station 120 is installed in a moving body (for example, a vehicle) for which coordinates are to be obtained. System 100 performs positioning of positioning station 120 and obtains the coordinates of positioning station 120 on the Earth. The coordinates are, for example, three-dimensional coordinates of latitude, longitude, and altitude, but may be two-dimensional coordinates such as latitude and longitude.

Base station 110 and positioning station 120 receive a positioning signal from a positioning satellite (not shown). For example, the positioning satellite is a GPS satellite. Base station 110 generates positioning data based on the received positioning signal. Base station 110 sends the generated positioning data to positioning station 120. Positioning station 120 performs interferometric positioning by the RTK (Real Time Kinematic) method using the received positioning data and the positioning data generated by positioning station 120 or the like. Positioning station 120 includes a dedicated terminal for positioning, a computer on which dedicated software is installed, and the like. For example, positioning station 120 includes a positioning-dedicated terminal, a personal computer having a positioning function, a smartphone or tablet having a positioning function, a server performing a positioning service, and the like.

Figure 2:
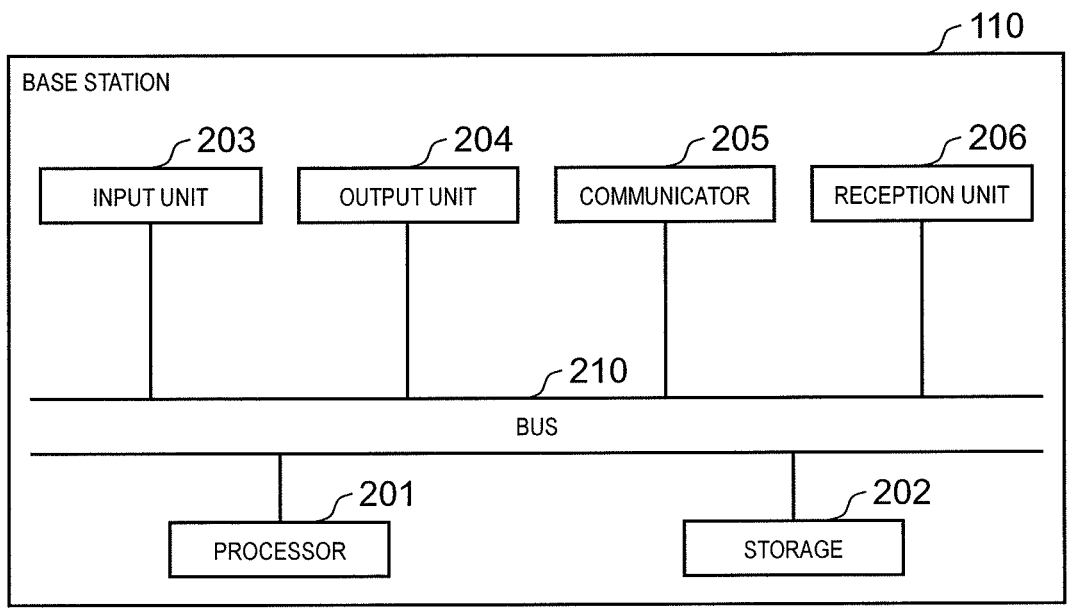
FIG. 2 is a block diagram of a base station in Embodiment 1.

FIG. 2 is a block diagram of base station 110 in Embodiment 1. Base station 110 includes processor 201, storage 202, input unit 203, output unit 204, communicator 205, reception unit 206, and bus 210.

Processor 201 controls other elements of base station 110 via bus 210. Processor 201 may be configured by using a general-purpose central processing unit (CPU) as an example. In addition, processor 201 may execute a predetermined program. In base station 110, processor 201 executes a predetermined program, whereby positioning data is generated based on the positioning signal.

Storage 202 acquires various information from other elements and holds the information temporarily or permanently. Storage 202 is a generic name of a so-called primary storage device and secondary storage device. A plurality of storages 202 may be physically disposed. As storage 202, for example, direct random-access memory (DRAM), hard disk drive (HDD), solid-state drive (SSD) are used.

Input unit 203 receives information from the outside. The information received from the outside by input unit 203 includes information on the inputs from an operator of base station 110. Input unit 203 may be configured by using an input interface such as a keyboard as an example.

Output unit 204 presents information to the outside. The information presented by output unit 204 includes information on positioning and the like. Output unit 204 may be configured by using an existing output interface such as a display as an example.

Communicator 205 communicates with an external device via a communication path. A device (communicating target) to communicate with communicator 205 includes positioning station 120. Communicator 205 may be configured by using a communication interface capable of communicating with an existing communication network such as a wireless LAN communication network, 3G communication network or the like as an example.

Reception unit 206 receives the positioning signal from the positioning satellite. In the present embodiment, a GPS satellite is used as an example of a positioning satellite. The GPS satellite transmits L1 signal (1575.42 MHz), L2 signal (1227.60 MHz), and the like as positioning signals.

The configuration of base station 110 listed above is an example. It is also possible to configure by integrating a part of each constituent element of base station 110. It is also possible to configure by dividing a part of each constituent element of base station 110 into a plurality of elements. A part of respective constituent elements of base station 110 may be omitted. It is also possible to configure by adding other elements to base station 110. In addition, base station 110 of the present disclosure includes a reference station established by a municipality such as a country or the like.

Figure 3:
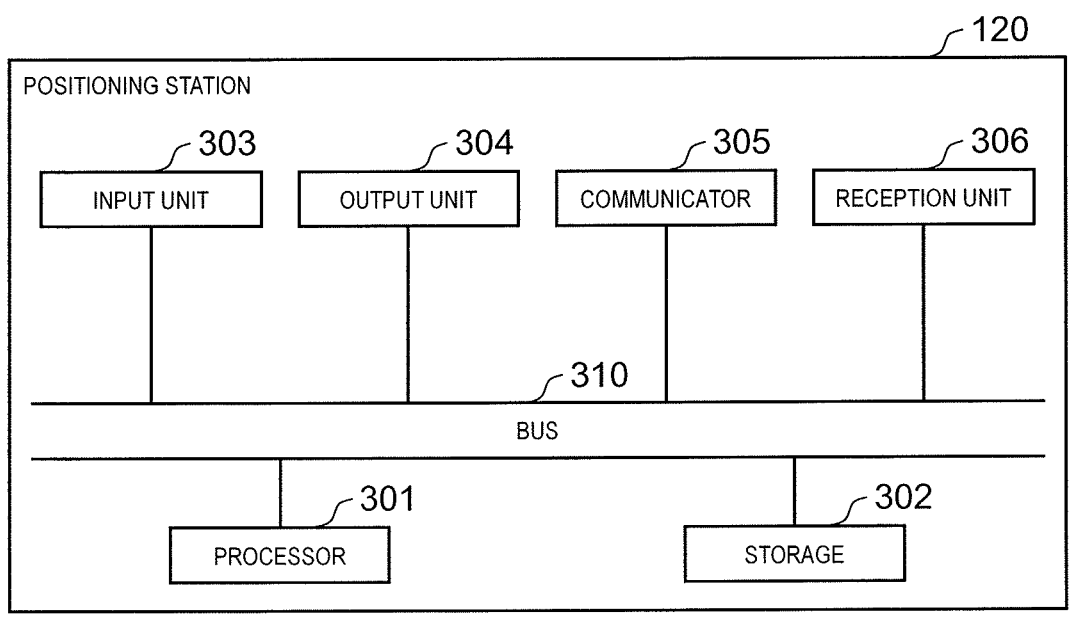
FIG. 3 is a block diagram of a positioning station in Embodiment 1.

FIG. 3 is a block diagram of positioning station 120 in Embodiment 1. Positioning station 120 includes processor 301, storage 302, input unit 303, output unit 304, communicator 305, reception unit 306, and bus 310.

Processor 301 controls the other elements of positioning station 120 via bus 310. Processor 301 may be configured by using a general-purpose CPU as an example. In addition, the processor 301 may execute a predetermined program. In positioning station 120, processor 301 executes a predetermined program, whereby positioning data is generated based on a positioning signal.

Storage 302 acquires various information from other elements and holds the information temporarily or permanently. Storage 302 is a generic name of a so-called primary storage device and secondary storage device. A plurality of storages 302 may be physically disposed. As storage 302, for example, DRAM, HDD or SSD is used.

Input unit 303 receives information from the outside. The information received from the outside by input unit 303 includes information on the inputs from the operator of positioning station 120. Input unit 303 may be configured by using an input interface such as a keyboard as an example.

Output unit 304 presents information to the outside. The information presented by output unit 304 includes information on positioning and the like. Output unit 304 may be configured by using an existing output interface such as a display as an example.

Communicator 305 communicates with an external device via a communication path. A device (communicating target) to communicate with communicator 305 includes base station 110. Communicator 305 may be configured by using a communication interface capable of communicating with an existing communication network such as a wireless LAN communication network, 3G communication network or the like as an example.

Reception unit 306 receives the positioning signal from the positioning satellite. In the present embodiment, a GPS satellite is used as an example of a positioning satellite. The GPS satellite transmits L1 signal (1575.42 MHz), L2 signal (1227.60 MHz), and the like as positioning signals.

The configuration of positioning station 120 listed above is an example. It is also possible to configure by integrating a part of each component of positioning station 120. It is also possible to configure by dividing a part of each constituent element of positioning station 120 into a plurality of elements. A part of each component of positioning station 120 may be omitted. It is also possible to configure by adding other elements to positioning station 120.

In the present embodiment, processor 301 of positioning station 120 has a function of outputting the coordinates of the moving body. Here, the function of processor 301 of positioning station 120 will be described in detail with reference to drawings.

Figure 4:
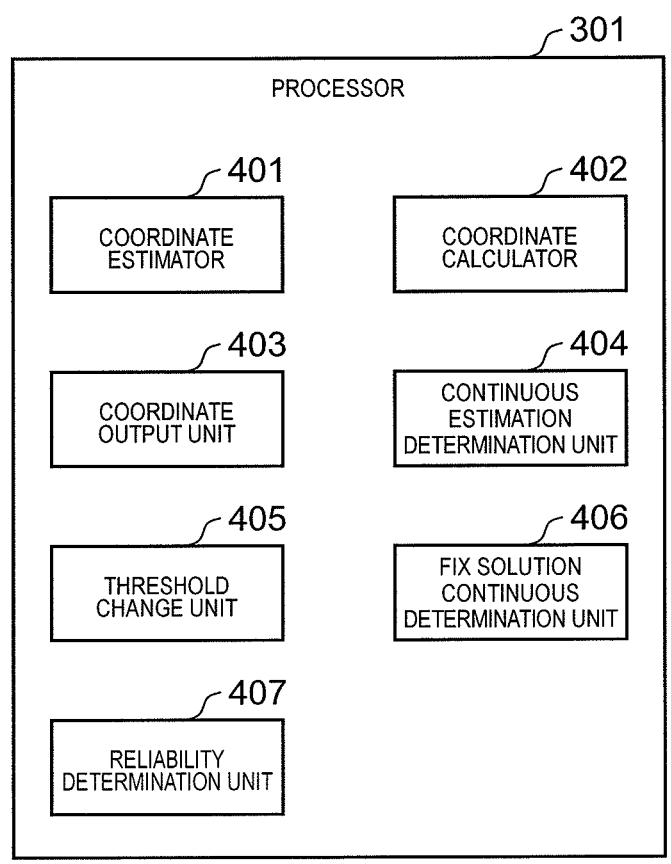
FIG. 4 is a functional block diagram of a processor of the positioning station in Embodiment 1.

FIG. 4 is a functional block diagram of processor 301 of positioning station 120. As shown in FIG. 4, processor 301 includes coordinate estimator 401, coordinate calculator 402, coordinate output unit 403, continuous estimation determination unit 404, threshold change unit 405, fix solution continuous determination unit 406, and reliability determination unit 407.

Coordinate estimator 401 has a function of estimating the current coordinates of the moving body based on previous coordinates of the moving body and information on the speed of the moving body. The previous coordinates of the moving body are, for example, the coordinates output last time (that is, before one epoch). Processor 301 outputs the coordinates of the moving body for each epoch. In the present disclosure, the word "the current coordinates of the moving body" is used in the sense of contrasting the previous coordinates of the moving body, but "the current coordinates of the moving body" means the coordinates at which the moving body is assumed to exist after the "previous coordinates of the moving body", "current" does not necessarily mean the time at which the coordinate output device is operating. The epoch is a time unit representing the interval (cycle) of data acquisition. For example, in a case where operating at 5 Hz, five pieces of data are acquired per second, so one epoch is 0.2 seconds. Information on the speed of the moving body is, for example, the speed of the moving body calculated from the Doppler frequency included in the positioning data (described later) or the speed of the moving body output from a speed detection module (not shown) provided in the moving body. Speed information is defined as a pair of movement amounts per unit time with respect to a predetermined dimension such as "X meter per second in a south direction, Y meter per second in an east direction, and Z meter per in a height direction". Coordinate estimator 401 estimates the current coordinates of the moving body by adding the movement amount of one epoch obtained from the speed of the moving body to the previous coordinates of the moving body (for example, the coordinates one EPOC before). Coordinates estimated in this may are also called dead reckoning coordinates or dead reckoning (DR) solutions.

Coordinate calculator 402 has a function of calculating the current coordinates of the moving body as a fix solution or a float solution by performing interferometric wave positioning (for example, RTK calculation processing) based on the positioning data of base station 110 installed at a predetermined point and the positioning data of positioning station 120 placed on the moving body.

Here, the positioning data will be described. In the present embodiment, the positioning data includes pseudo distance information, carrier phase information, and Doppler frequency information.

Pseudo distance information is information on the distance between the satellite and the own station (base station 110 and positioning station 120). The pseudo distance information may be generated by the processor (processor 201 of base station 110 and processor 301 of positioning station 120) analyzing the positioning signal. The processor may obtain the arrival time of the positioning signal based on two, (1) a difference between the pattern of the code carried by the positioning signal and the pattern of the code generated by itself and (2) the signal generation time of the satellite and the signal reception time thereof included in the message (NAVDATA) included in the positioning signal. The processor may obtain the pseudo distance with the satellite by multiplying the arrival time by the light speed. This distance includes an error caused by a difference between the clock of the satellite and the clock thereof. Normally, pseudo distance information is generated for at least four satellites to reduce this error.

The carrier phase information is the phase of the positioning signal received by the own station (base station 110 and positioning station 120). The positioning signal (L1 signal, L2 signal, and the like) is a predetermined sine wave. Carrier phase information may be generated by the processor (processor 201 of base station 110 and processor 301 of positioning station 120) analyzing the positioning signal.

The Doppler frequency information is information on the relative speed between the satellite and the own station (base station 110 and positioning station 120). Doppler frequency information may be generated by the processor (processor 201 of base station 110 and processor 301 of positioning station 120) analyzing the positioning signal.

As described above, the positioning data is generated by processor 201 of base station 110 and processor 301 of positioning station 120, respectively.

Next, the RTK calculation processing will be described. The RTK calculation processing is an arithmetic processing for executing the RTK method which is one of interferometric positioning.

The RTK method uses the carrier phase integrated value of the positioning signal transmitted by the positioning satellite to perform positioning of positioning station 120. The carrier phase integrated value is the sum of (1) the number of waves of the positioning signal from the satellite to a certain point and (2) the phase. Since the frequency (and wavelength) of the positioning signal is known if the carrier phase integrated value is obtained, the distance from the satellite to the certain point may be obtained. Since the number of waves of the positioning signal is unknown, it is called an integer bias.

Important things in executing the RTK method are removal of noise and estimation of an integer bias.

In the RTK method, noise is eliminated by calculating a difference called double difference. The double difference is the difference between the values obtained by calculating the difference (single difference) between carrier phase integrated values of one receiver with respect to two satellites respectively between two receivers (in the present embodiment, base station 110 and positioning station 120). In the present embodiment, at least four satellites are used for positioning using the RTK method. Therefore, the double difference is calculated by the combination of at least four satellites. In this calculation, the positioning data of base station 110 and the positioning data of positioning station 120 are used.

In the RTK method, estimation of an integer bias may be performed in various ways. As an example, in the present embodiment, by executing the procedure of (1) estimation of a float (FLOAT) solution by least squares method and (2) test of a fix (FIX) solution based on the float solution, an integer bias is estimated.

Estimation of a float solution by the least squares method is executed by preparing simultaneous equations by using a combination of double differences generated for each time unit and solving the prepared simultaneous equations by the least squares method. The simultaneous equations are generated for each time unit called an epoch. In this calculation, the positioning data of base station 110, the positioning data of positioning station 120, and the known coordinates of base station 110 are used. The estimated value of the integer bias found in this manner is called a float solution.

The float solution found in this manner is a real number, whereas the true value of an integer bias is an integer. Therefore, it is necessary to work to set the float solution to an integer value by rounding the float solution. However, there are a plurality of candidates for combinations in rounding the float solution. Therefore, it is necessary to test which candidate is the correct integer value. A solution that is considered to be somewhat more reliable as an integer bias by the test is called a fix solution. The test here is performed by using the reliability in reliability determination unit 407 to be described later. The fix solution being determined is also called "integer ambiguity is determined". In order to narrow down of the candidates of integer values more efficiently, the positioning data of base station 110 is used.

Returning to FIG. 4, the description of the configuration of processor 301 will be continued. In a case where the current coordinates of the moving body are calculated as a fix solution, coordinate output unit 403 outputs the fix solution as the current coordinates of the moving body.

Figure 5:
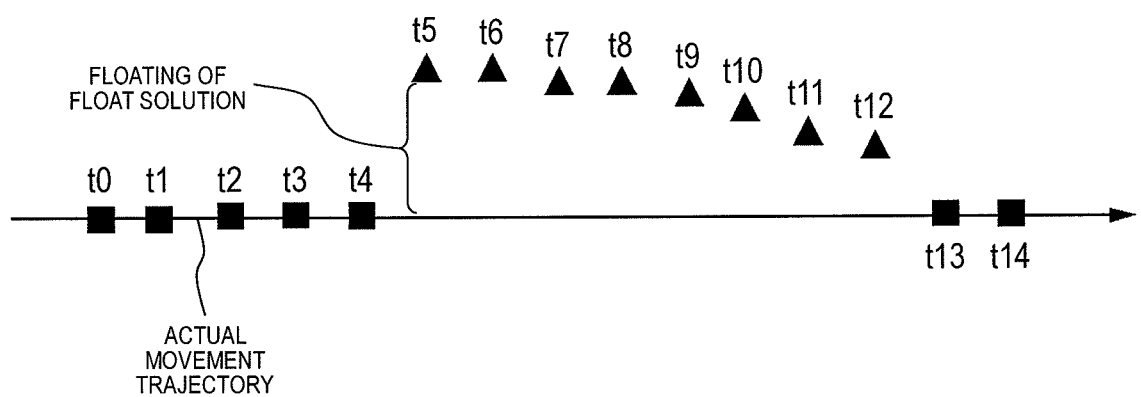
FIG. 5 is an explanatory diagram of a positioning error (jump) of a float solution in Embodiment 1.
Figure 6:
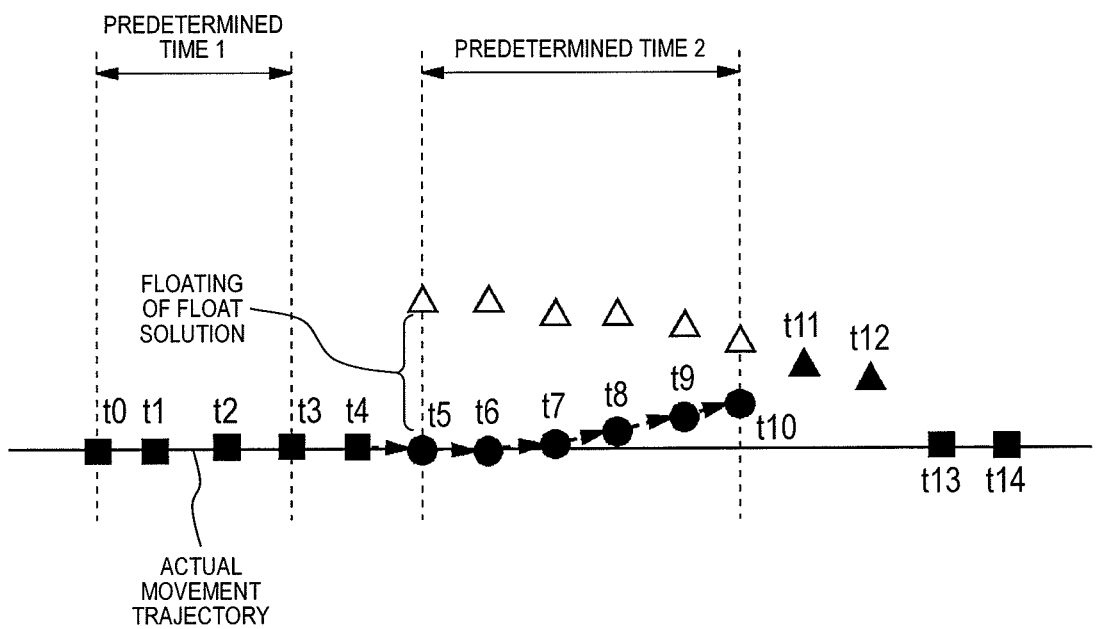
FIG. 6 is a diagram for describing an example of coordinate outputs in Embodiment 1.
Figure 7:
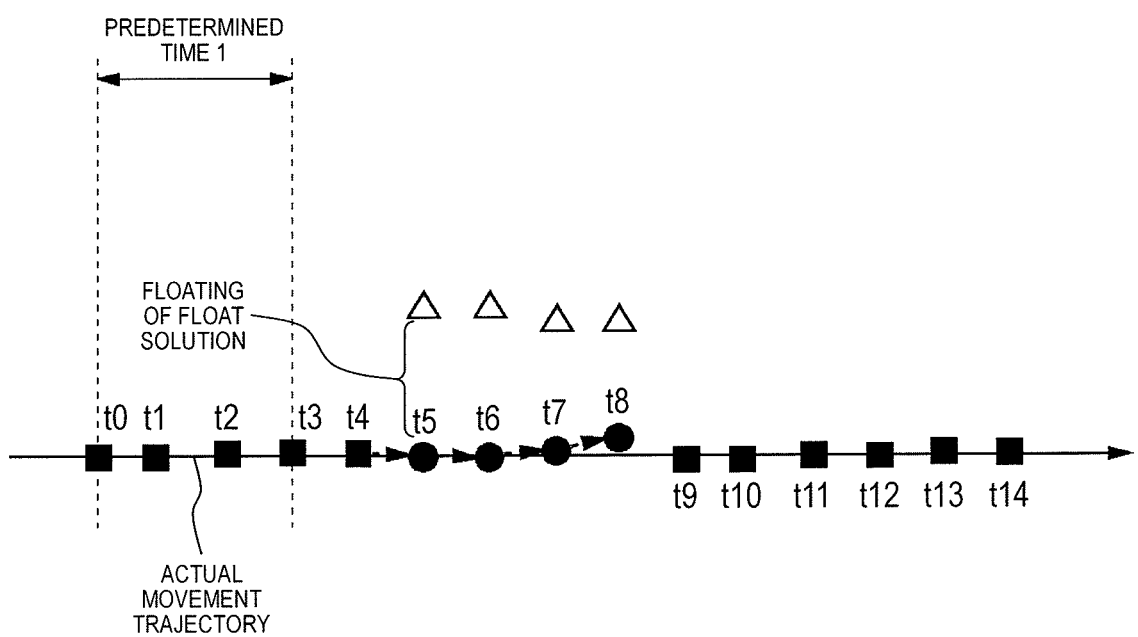
FIG. 7 is a diagram for describing another example of the coordinate outputs in Embodiment 1.

Here, the principle of coordinate outputs according to the present embodiment will be described with reference to drawings. As shown in FIG. 5, if interferometric positioning by the RTK method is simply applied to the positioning of the moving body, a positioning error (jump) may occur in the float solution. In the example of FIG. 5, a fix solution is obtained and output from time t0 to t4, but a fix solution is not obtained from time t5 to t12, and a float solution is output. From time t13 to t14, a fix solution is again obtained and output. In FIGS. 5 to 7, the fix solution is indicated by a square, the float solution by a triangle, and the DR solution by a circle. In addition, solutions to be output are indicated in black, solutions not to be output are indicated in white. As seen from FIG. 5, a large positioning error occurs from time t5 to t12 (especially at time t5).

Therefore, in the present embodiment, as shown in FIG. 6, in a case where a predetermined condition is satisfied, the DR solution is output as the current coordinates of the moving body. For example, in a case where a fix solution has been continuously selected for a predetermined time (predetermined time 1) or more, and the fix solution is not obtained, the DR solution is output as the current coordinates of the moving body. In the example of FIG. 6, a fix solution is continuously selected between times t0 and t3 (predetermined time 1), and after time t4, a DR solution may be selected. At time t4, since a fix solution is obtained, a DR solution is not selected, but from time t5 to t10, since a fix solution is not obtained, a DR solution is selected and output as the current coordinates of the moving body.

In this case, in a case where a DR solution is selected continuously for a predetermined time (predetermined time 2) or more, even if a fix solution is not obtained considering the accumulation of the errors of the DR solution, the float solution is output so as not to output the DR solution as the current coordinates of the moving body. In the example of FIG. 6, a DR solution is selected continuously from time t5 to t10 (predetermined time 2). Therefore, at time t11, a DR solution is not selected and a float solution is selected.

In addition, even in a case where it is possible to select a DR solution, if a fix solution is obtained, a fix solution is output without outputting a DR solution. In the example of FIG. 7, a fix solution is continuously selected between times t0 and t3 (predetermined time 1), and after time t4, a DR solution may be selected. Then, a DR solution is continuously selected from time t5 to t8, but since a fix solution is obtained at time t9, in this case, a fix solution is output as the current coordinates of the moving body at time t9.

Continuous estimation determination unit 404 has a function of determining whether or not the current coordinates of the moving body estimated from the information on the speed have been continuously output for a predetermined number of times or more. In the present embodiment, continuous estimation determination unit 404 determines whether or not a DR solution has been output continuously for a predetermined number of times or more. In a case where it is determined that a DR solution has been output continuously for the predetermined number of times or more, coordinate output unit 403 outputs a float solution as the current coordinates of the moving body. The predetermined number of times may also be determined in terms of time (that is, as a predetermined time). As described above, the output of coordinates is performed for each epoch. In a case where one epoch is 0.2 seconds, for example, the predetermined number of times is 300 times, and the predetermined time (predetermined time 2 in FIG. 8) is 60 seconds.

In a case where the current coordinates of the moving body are not calculated as a fix solution, fix solution continuous determination unit 406 has a function of determining whether or not the current coordinates of the moving body have been calculated as a fix solution continuously for the predetermined number of times or more. In the present embodiment, fix solution continuous determination unit 406 determines whether or not the current coordinates of the moving body have been calculated as a fix solution continuously for the predetermined number of times or more. In a case where it is determined that a fix solution has been output continuously for the predetermined number of times or more, coordinate output unit 403 outputs a DR solution as the current coordinates of the moving body and, in a case where it is not determined that the fix solution has been output continuously for the predetermined number of times or more, outputs a float solution as the current coordinates of the moving body. The predetermined number of times may be determined in terms of time (that is, as a predetermined time). As described above, the output of coordinates is performed for each epoch. In a case where one epoch is 0.2 seconds, for example, the predetermined number of times is 100 times, and the predetermined time (predetermined time 1 in FIG. 8) is 20 seconds.

Reliability determination unit 407 has a function of determining the reliability of the calculation of the fix solution by interferometric wave positioning. The reliability is a frequency that statistically indicates whether or not the positioning result calculated by using the solution of the RTK calculation is close to a true value. In the present embodiment, an ambiguity ratio (AR) value is used as the reliability. Reliability determination unit 407 calculates the AR value each time the RTK positioning calculation is executed. In a case where the AR value is lower than the predetermined value (for example, 3.0), coordinate output unit 403 outputs a float solution as the current coordinates of the moving body, and outputs a fix solution as the current coordinates of the moving body in a case where the AR value is higher than the predetermined value (for example, 3.0).

[1-2. Operation]

Figure 8:
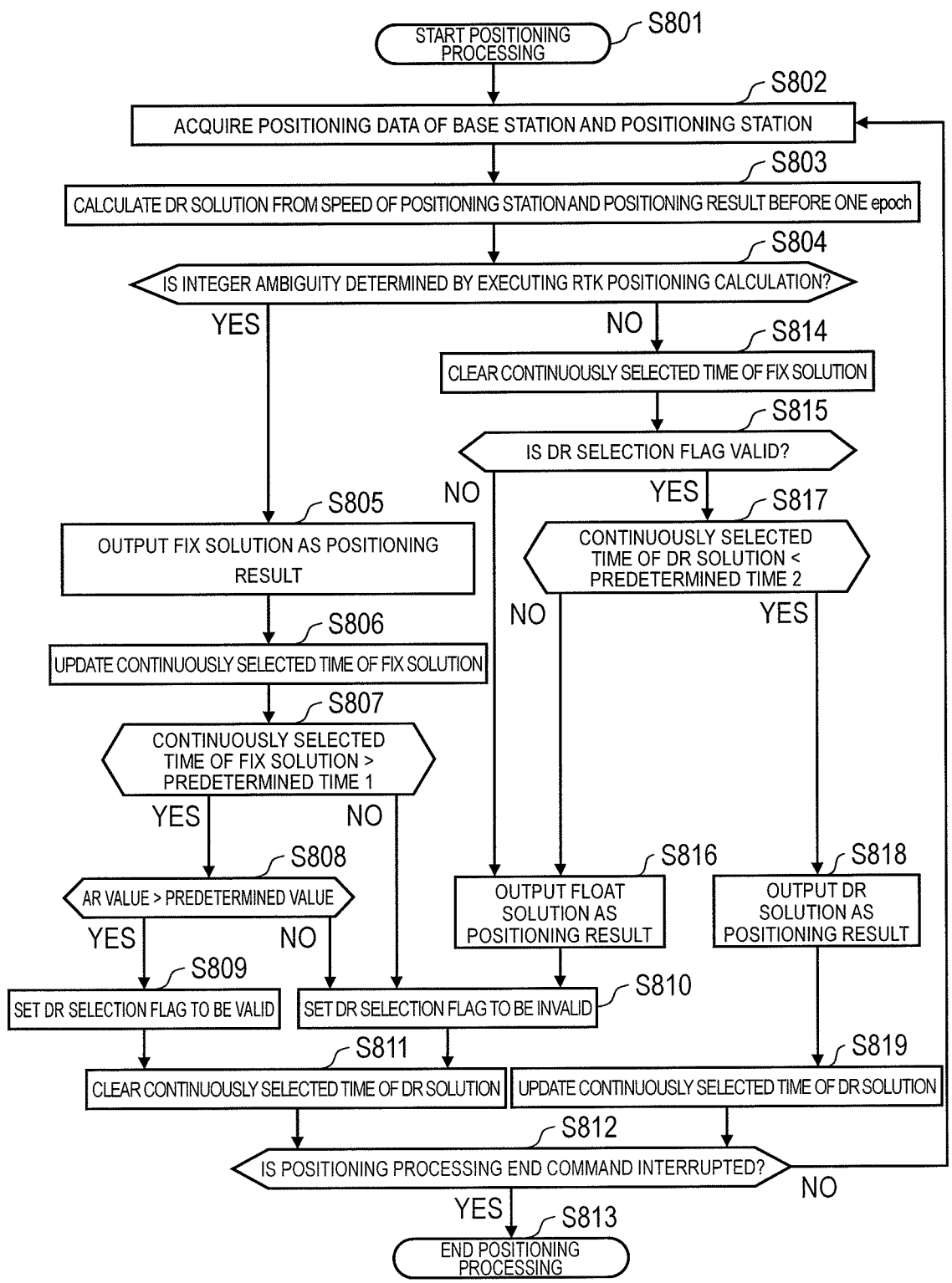
FIG. 8 is a flowchart showing positioning processing in Embodiment 1.

The positioning processing performed by positioning system 100 configured as described above will be described. FIG. 8 is a flowchart showing positioning processing in Embodiment 1.

In the present embodiment, an example in which processor 301 of positioning station 120 performs positioning processing will be described. However, the positioning processing of the present disclosure is not limited to what is done by positioning station 120 itself. The positioning processing may be performed by a general-purpose computer added inside positioning system 100.

As shown in FIG. 8, in step S801, processor 301 starts positioning processing. The timing of starting positioning processing may be randomly determined. For example, when positioning station 120 is powered on, processor 301 may start positioning processing. In addition, when a command to start positioning processing is input by input unit 303 of positioning station 120, processor 301 may start positioning processing.

In step S802, processor 301 acquires the positioning data of base station 110 and positioning station 120. Processor 301 acquires the positioning data of base station 110 via communicator 305. Processor 301 successively acquires the received positioning data of base station 110. Processor 301 records the acquired positioning data of base station 110 in storage 302. The positioning data of base station 110 is generated by processor 201 of base station 110. Processor 201 of base station 110 generates positioning data based on the positioning signal received by reception unit 206. In addition, processor 301 acquires the positioning data of positioning station 120 by generating the positioning data based on the positioning signal received by reception unit 306. Processor 301 records the acquired positioning data of positioning station 120 in storage 302.

In step S803, a DR solution is calculated (estimated) as the current coordinates of the moving body from the speed of positioning station 120 and the positioning result (output coordinates) before one epoch. In addition, in step S804, RTK calculation processing is executed and a fix solution or a float solution is calculated as the current coordinates of the moving body. In step S804, it is determined whether or not the integer ambiguity of the carrier phase is determined, that is, whether or not a fix solution is obtained. In the present embodiment, if the AR value of the solution obtained by the RTK calculation processing is, for example, 3.0 or more, ambiguity is determined (fix solution is calculated).

In a case where the integer ambiguity is determined in step S804, that is, in a case where a fix solution is obtained as the current coordinates of the moving body, in step S805, the fix solution is output as a positioning result, and in step S806, the continuously selected times (the number of times continuously selected) of the fix solution is updated (incremented). Then, in step S807, it is determined whether or not the continuously selected time (the number of times continuously selected) of a fix solution is greater than a predetermined time (predetermined number of times). For example, the predetermined number of times is 100 times, and a predetermined time (predetermined time 1 in FIG. 8) is 20 seconds.

In a case where it is determined that the continuously selected time (the number of times continuously selected) of a fix solution is greater than the predetermined time (predetermined number of times) in step S807, it is determined whether or not the AR value is larger than the predetermined value (for example, 5.0) in step S808. In a case where it is determined that the AR value is larger than a predetermined value in step S808, a DR selection flag is set to be valid in step S809. On the other hand, in a case where it is determined that the continuously selected time (the number of times continuously selected) of a fix solution is smaller than a predetermined time (predetermined number of times) in step S807, or when it is determined that the AR value is smaller than a predetermined value in step S808, the DR selection flag is set to be invalid in step S810.

Thereafter, in step S811, the continuously selected time of a DR solution is cleared. Then, in step S812, it is determined whether or not a positioning processing end instruction has been interrupted. If the positioning processing end command is not interrupted, the processing returns to step S802 and repeats positioning processing. When the positioning processing end instruction is interrupted, in step S813, positioning processing is ended.

On the other hand, in a case where the integer ambiguity is not determined in step S804, that is, in a case where a fix solution is not obtained as the current coordinates of the moving body, the continuously selected time of the fix solution is cleared in step S814. Then, in step S815, it is determined whether the DR selection flag is valid or not.

In a case where it is determined that the DR selection flag is not valid (invalid) in step S815, a float solution is output as a positioning result in step S816. Thereafter, the flow advances to step S810 to invalidate the DR selection flag.

In a case where it is determined that the DR selection flag is valid in step S815, it is determined whether or not the continuously selected time (the number of times continuously selected) of a DR solution is smaller than a predetermined time (predetermined number of times) in step S817. For example, the predetermined number of times is 300 times, and the predetermined time (predetermined time 2 in FIG. 8) is 60 seconds.

In a case where it is determined that the continuously selected time (the number of times continuously selected) of a DR solution is greater than the predetermined time (predetermined number of times) in step S817, the flow proceeds to step S816 and the float solution is output as a positioning result. On the other hand, in a case where it is determined that the continuously selected time (the number of times continuously selected) of a DR solution is smaller than the predetermined time (predetermined number of times) in step S817, the DR solution is output as a positioning result in step S818, and the continuously selected time of the DR solution is updated (incremented) in step S819.

The processing from step S806 to step S810 is not necessarily required and may be omitted. In a case where the processing from step S806 to step S810 is omitted, the processing in step S814 and step S815 is also omitted. In addition, either one of the determination processing in step S807 and the determination processing in step S808 may be performed.

[1-3. Effect and the Like]

As described above, in the present embodiment, current coordinates of a moving body are estimated based on previous coordinates of the moving body and information on a speed of the moving body, the current coordinates of the moving body are calculated as either of a fix solution or a float solution by executing interferometric wave positioning based on positioning data of a base station installed at a predetermined point and positioning data of positioning station placed on the moving body, the current coordinates of the moving body calculated as the fix solution are output in a case where the current coordinates of the moving body are calculated as the fix solution, a time during which the current coordinates of the moving body have been calculated as the fix solution is determined, and the current coordinates of the moving body estimated from the information on the speed are calculated in a case where a time during which the current coordinates of the moving body have been calculated as the fix solution is equal to or more than a predetermined value and in a case where the current coordinates of the moving body are not calculated as the fix solution. As a result, it is possible to suppress the influence of the positioning error (jump) of the float solution.

Another Embodiment

As described above, Embodiment 1 has been described as an example of the technique disclosed in the present application. However, the technique in the present disclosure is not limited thereto and may also be applied to embodiments in which changes, substitutions, additions, omissions, and the like are made as appropriate. Therefore, another embodiment will be described below.

Embodiment 2

Hereinafter, Embodiment 2 will be described with reference to FIGS. 9 to 13. Here, the following description will be focused on the point that the positioning system in Embodiment 2 is different from the one in Embodiment 1. Unless otherwise mentioned, the configuration and operation of the present embodiment are the same as those of Embodiment 1.

[2-1. Configuration]

FIG. 4 is a functional block diagram of processor 301 of positioning station 120 according to the present embodiment. As shown in FIG. 4, processor 301 includes coordinate estimator 401, coordinate calculator 402, coordinate output unit 403, continuous estimation determination unit 404, threshold change unit 405, fix solution continuous determination unit 406, and reliability determination unit 407.

In the present embodiment, in a case where the current coordinates of the moving body are calculated as a fix solution, coordinate output unit 403 outputs the fix solution as the current coordinates of the moving body. On the other hand, in a case where the current coordinates of the moving body are not calculated as a fix solution, coordinate output unit 403 outputs either a float solution or a DR solution as the current coordinates of the moving body. In this case, if the deviation between the DR solution and the float solution (the distance between the coordinates of the DR solution and the float solution) is larger than the predetermined threshold, the DR solution is output as the current coordinates of the moving body, and if the deviation is smaller than the predetermined threshold, the float solution is output as the current coordinates of the moving body.

Figure 9:
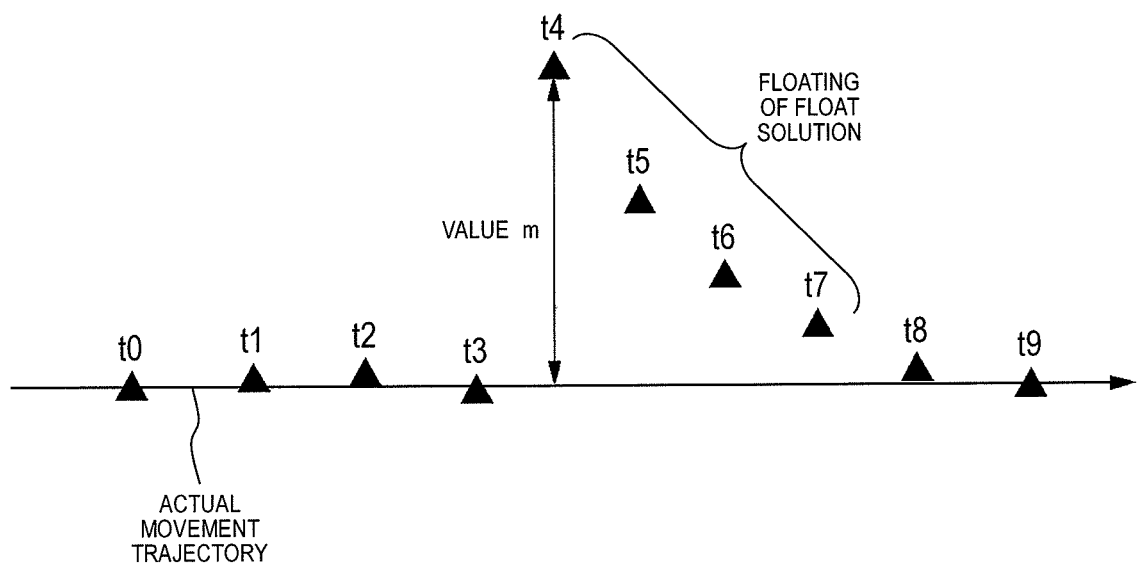
FIG. 9 is an explanatory diagram of a positioning error (jump) of a float solution in Embodiment 2.

Here, the principle of coordinate outputs according to the present embodiment will be described with reference to drawings. As shown in FIG. 9, if the interferometric positioning by the RTK method is simply applied to the positioning of the moving body, a positioning error (jump) may occur in the float solution. In the example of FIG. 9, a float solution close to an actual movement trajectory is obtained from times t0 to t3, but a large positioning error has occurred from times t4 to t7 (especially at time t4). Also in FIGS. 9 to 12, the float solution is indicated with a triangle mark, and the DR solution is indicated with a circle. In addition, solutions to be output are indicated in black, solutions not to be output are indicated in white.

Figure 10:
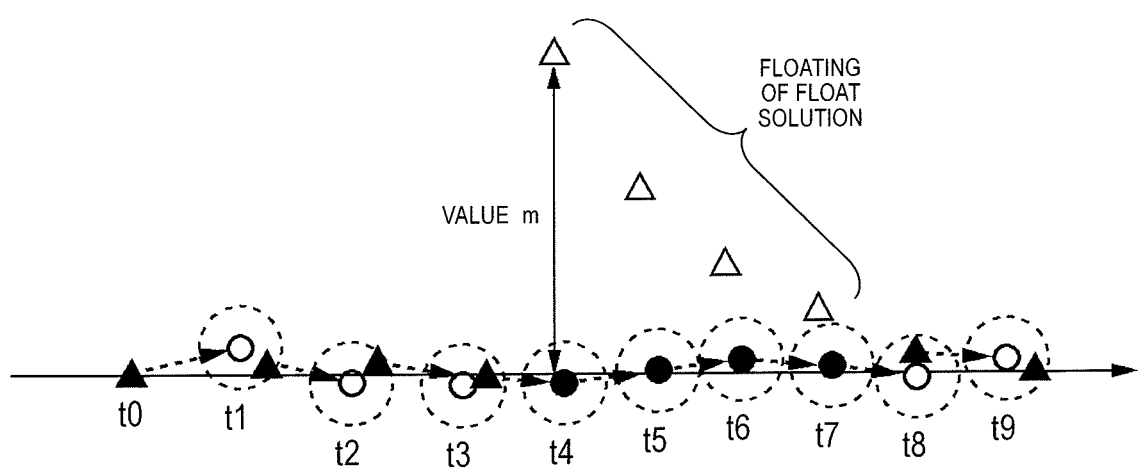
FIG. 10 is a diagram for describing the principle of coordinate outputs in Embodiment 2.
Figure 11:
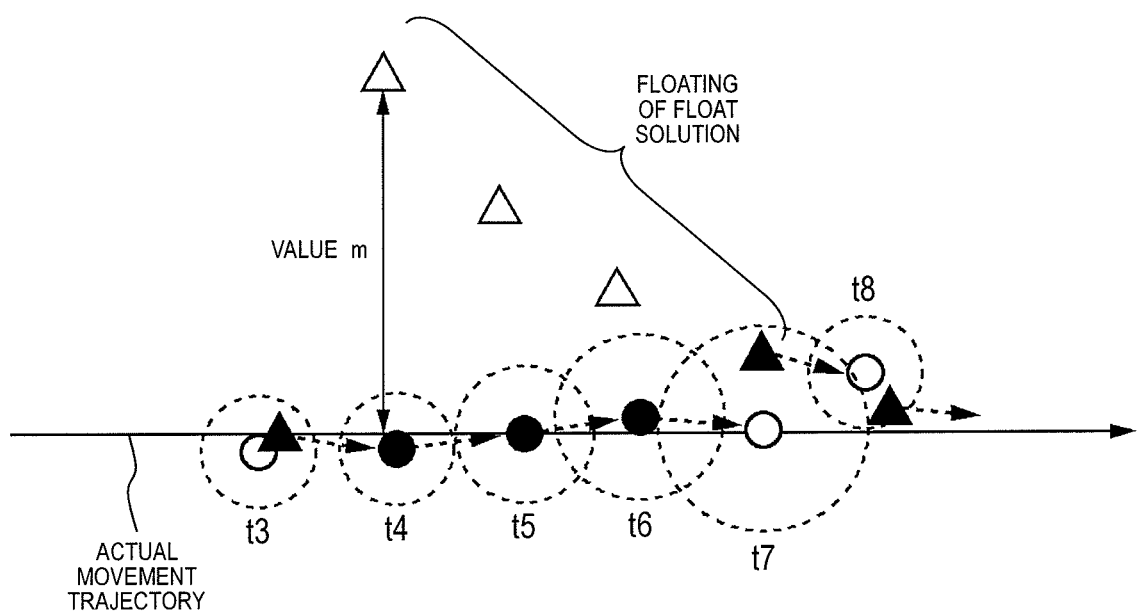
FIG. 11 is a diagram showing an example of a change of a threshold in Embodiment 2.
Figure 12:
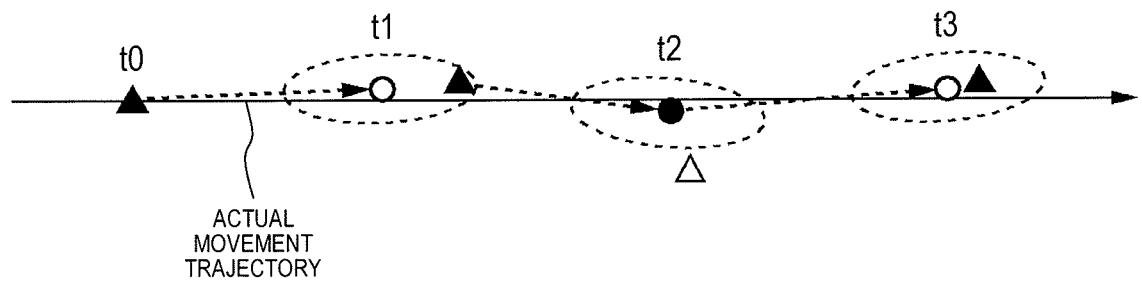
FIG. 12 is a diagram showing another example of a change of the threshold in Embodiment 2.

Therefore, in the present embodiment, as shown in FIG. 10, if the deviation between the DR solution and the float solution (the distance between the coordinates of the DR solution and the float solution) is larger than the predetermined threshold, the DR solution is output as the current coordinates of the moving body, and if the deviation is smaller than the predetermined threshold, the float solution is output as the current coordinates of the moving body. In FIGS. 10 to 12, the threshold is indicated by a dashed circle centered on the DR solution. In the example of FIG. 10, from times t1 to t3, t8, and t9, since the deviation between the DR solution and the float solution is smaller than the threshold (because the float solution is located inside the dashed circle), the float solution is output as the current coordinates of the moving body. On the other hand, from times t4 to t7, since the deviation between the DR solution and the float solution is larger than the threshold (the float solution is located outside the dashed circle), the DR solution is output as the current coordinates of the moving body.

Continuous estimation determination unit 404 has a function of determining whether or not the current coordinates of the moving body estimated from the information on the speed have been continuously output for a predetermined number of times or more. In the present embodiment, continuous estimation determination unit 404 determines whether or not a DR solution has been output continuously for a predetermined number of times or more. In a case where it is determined that a DR solution has been output continuously for the predetermined number of times or more, coordinate output unit 403 outputs a float solution as the current coordinates of the moving body even in a case where the deviation is larger than a predetermined threshold. The predetermined number of times may also be determined in terms of time (that is, as a predetermined time). As described above, the output of coordinates is performed for each epoch. In a case where one epoch is 0.2 seconds, for example, the predetermined number of times is 300 times, and the predetermined time (predetermined time 2 in FIG. 13) is 60 seconds.

Threshold change unit 405 has a function of changing the magnitude of a predetermined threshold according to the number of times the current coordinates of the moving body estimated from the information on the speed are continuously output. For example, as shown in FIG. 11, threshold change unit 405 may be modified so that the threshold is gradually increased each time a DR solution is output continuously. In the example of FIG. 11, the threshold is gradually increased from times t5 to t7 (the radius of the dashed circle is increased).

In addition, as shown in FIG. 12, threshold change unit 405 may weight the threshold so that the threshold increases with respect to the moving direction of the moving body. In addition, threshold change unit 405 may weight the threshold so that the threshold becomes smaller with respect to a direction (for example, a vertical direction) intersecting with the moving direction of the moving body. Alternatively, the threshold change unit 405 may weight the threshold so that the threshold increases with respect to the moving direction of the moving body and weight the threshold so that the threshold becomes smaller with respect to a direction (for example, a vertical direction) intersecting with the moving direction of the moving body. In FIG. 12, the changed threshold is indicated by a broken line having a shape like an ellipse, for example.

In a case where the current coordinates of the moving body are not calculated as a fix solution, fix solution continuous determination unit 406 has a function of determining whether or not the current coordinates of the moving body have been calculated as a fix solution continuously for the predetermined number of times or more. In the present embodiment, fix solution continuous determination unit 406 determines whether or not the current coordinates of the moving body have been calculated as a fix solution continuously for the predetermined number of times or more. In a case where it is determined that a fix solution has been output continuously for the predetermined number of times or more, coordinate output unit 403 outputs a DR solution as the current coordinates of the moving body and outputs a float solution as the current coordinates of the moving body in a case where it is not determined that the fix solution has been output continuously for the predetermined number of times or more. The predetermined number of times may be determined in terms of time (that is, as a predetermined time). As described above, the output of coordinates is performed for each epoch. In a case where one epoch is 0.2 seconds, for example, the predetermined number of times is 100 times, and the predetermined time (predetermined time 1 in FIG. 13) is 20 seconds.

Reliability determination unit 407 has a function of determining the reliability of the calculation of a fix solution by interferometric wave positioning. The reliability is a frequency that statistically indicates whether or not the positioning result calculated by using the solution of the RTK calculation is close to a true value. In the present embodiment, an ambiguity ratio (AR) value is used as the reliability. Reliability determination unit 407 calculates the AR value each time the RTK positioning calculation is executed. In a case where the AR value is lower than the predetermined value (for example, 3.0), coordinate output unit 403 outputs a float solution as the current coordinates of the moving body, and outputs a fix solution as the current coordinates of the moving body in a case where the AR value is higher than the predetermined value (for example, 3.0).

[2-2. Operation]

Figure 13:
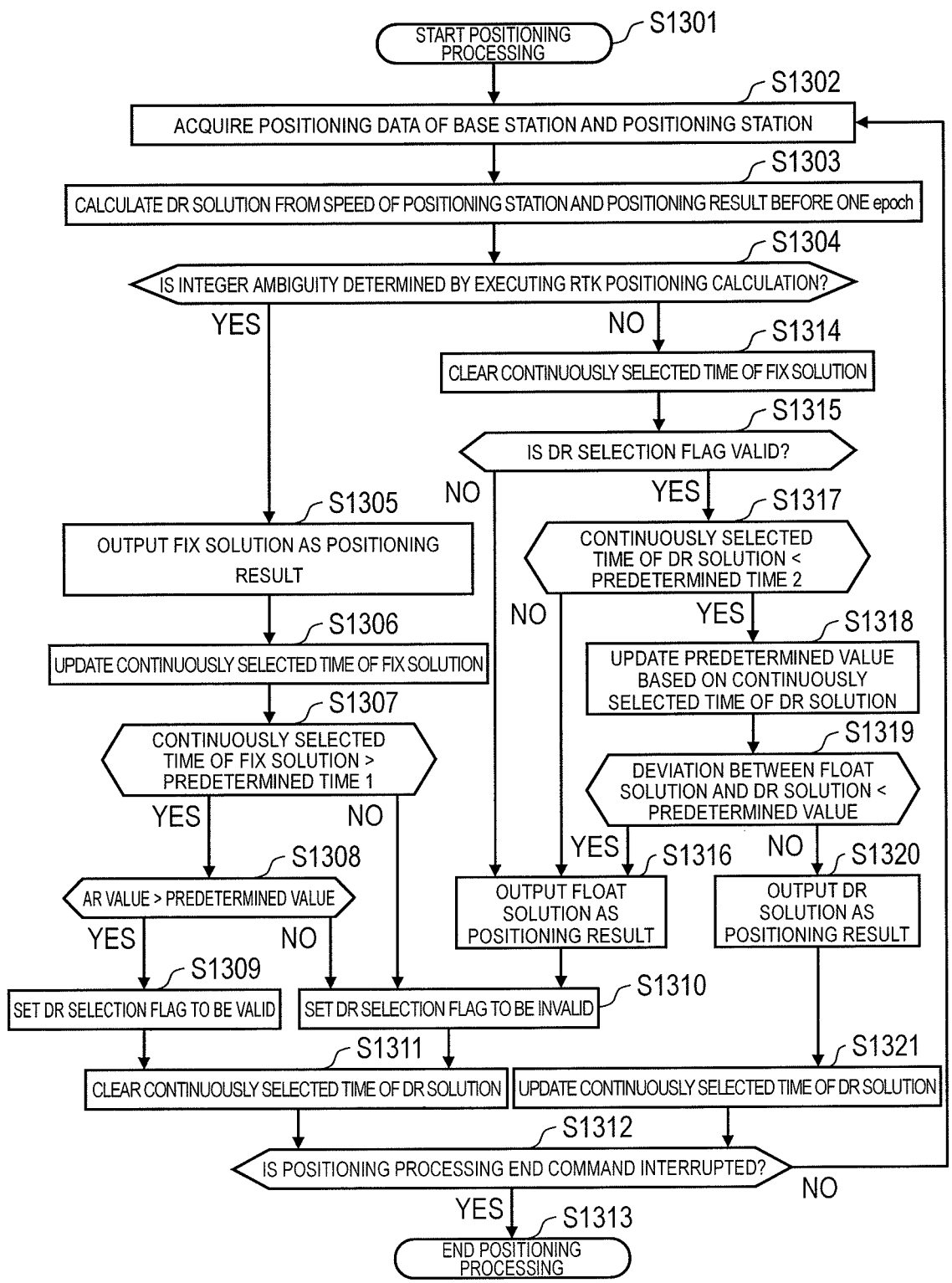
FIG. 13 is a flowchart showing positioning processing in Embodiment 2.

The positioning processing performed by positioning system 100 configured as described above will be described. FIG. 13 is a flowchart showing positioning processing in Embodiment 2.

In the present embodiment, an example in which processor 301 of positioning station 120 performs positioning processing will be described. However, the positioning processing of the present disclosure is not limited to what is done by positioning station 120 itself. The positioning processing may be performed by a general-purpose computer added inside positioning system 100. In addition, the processing from the following steps S1306 to S1310 is not necessarily required and may be omitted. In a case where the processing from step S1306 to step S1310 is omitted, the processing in step S1314 and step S1315 is also omitted. In addition, either one of the determination processing in step S1307 and the determination processing in step S1308 may be performed.

As shown in FIG. 13, in step S1301, processor 301 starts positioning processing. The timing of starting positioning processing may be randomly determined. For example, when positioning station 120 is powered on, processor 301 may start positioning processing. In addition, when a command to start positioning processing is input by input unit 303 of positioning station 120, processor 301 may start positioning processing.

In step S1302, processor 301 acquires the positioning data of base station 110 and positioning station 120. Processor 301 acquires the positioning data of base station 110 via communicator 305. Processor 301 successively acquires the received positioning data of base station 110. Processor 301 records the acquired positioning data of base station 110 in storage 302. The positioning data of base station 110 is generated by processor 201 of base station 110. Processor 201 of base station 110 generates positioning data based on the positioning signal received by reception unit 206. In addition, processor 301 acquires the positioning data of positioning station 120 by generating the positioning data based on the positioning signal received by reception unit 306. Processor 301 records the acquired positioning data of positioning station 120 in storage 302.

In step S1303, a DR solution is calculated (estimated) as the current coordinates of the moving body from the speed of positioning station 120 and the positioning result (output coordinates) before one epoch. In addition, in step S1304, RTK calculation processing is executed and a fix solution or a float solution is calculated as the current coordinates of the moving body. In step S1304, it is determined whether or not the integer ambiguity of the carrier phase is determined, that is, whether or not a fix solution is obtained. In the present embodiment, if the AR value of the solution obtained by the RTK calculation processing is, for example, 3.0 or more, ambiguity is determined (fix solution is calculated).

In a case where the integer ambiguity is determined in step S1304, that is, in a case where a fix solution is obtained as the current coordinates of the moving body, in step S1305, the fix solution is output as a positioning result, and in step S1306, the continuously selected times (the number of times continuously selected) of the fix solution is updated (incremented). Then, in step S1307, it is determined whether or not the continuously selected time (the number of times continuously selected) of a fix solution is greater than a predetermined time (predetermined number of times). For example, the predetermined number of times is 100 times, and the predetermined time (predetermined time 1 in FIG. 13) is 20 seconds.

In a case where it is determined that the continuously selected time (the number of times continuously selected) of a fix solution is greater than the predetermined time (predetermined number of times) in step S1307, it is determined whether or not the AR value is larger than the predetermined value (for example, 5.0) in step S1308. In a case where it is determined that the AR value is larger than a predetermined value in step S1308, a DR selection flag is set to be valid in step S1309. On the other hand, in a case where it is determined that the continuously selected time (the number of times continuously selected) of a fix solution is smaller than a predetermined time (predetermined number of times) in step S1307, or when it is determined that the AR value is smaller than a predetermined value in step S1308, the DR selection flag is set to be invalid in step S1310.

Thereafter, in step S1311, the continuously selected time of a DR solution is cleared. Then, in step S1312, it is determined whether or not the positioning processing end instruction has been interrupted. If the positioning processing end command is not interrupted, the processing returns to step S1302 and repeats positioning processing. When the positioning processing end instruction is interrupted, in step S1313, positioning processing is ended.

On the other hand, in a case where the integer ambiguity is not determined in step S1304, that is, in a case where a fix solution is not obtained as the current coordinates of the moving body, the continuously selected time of the fix solution is cleared in step S1314. Then, in step S1315, it is determined whether or not the DR selection flag is valid.

In a case where it is determined that the DR selection flag is not valid (invalid) in step S1315, the float solution is output as a positioning result in step S1316. Thereafter, the flow advances to step S1310 to invalidate the DR selection flag.

In a case where it is determined that the DR selection flag is valid in step S1315, it is determined whether or not the continuously selected time (the number of times continuously selected) of a DR solution is smaller than a predetermined time (predetermined number of times) in step S1317.

For example, the predetermined number of times is 300 times, and the predetermined time (predetermined time 2 in FIG. 13) is 60 seconds.

In a case where it is determined that the continuously selected time (the number of times continuously selected) of a DR solution is greater than the predetermined time (predetermined number of times) in step S1317, the flow proceeds to step S1316 and the float solution is output as a positioning result. On the other hand, in a case where it is determined that the continuously selected time (the number of times continuously selected) of a DR solution is smaller than the predetermined time (predetermined number of times) in step S1317, the threshold (predetermined value) is updated based on the continuously selected time of the DR solution in step S1318, and it is determined whether or not the deviation between the float solution and the DR solution is smaller than a threshold (predetermined value) in step S1319.

In a case where it is determined that the deviation between the float solution and the DR solution is smaller than the threshold (predetermined value), the flow proceeds to step S1316, and a float solution is output as a positioning result. On the other hand, in a case where it is determined that the deviation between the float solution and the DR solution is larger than the threshold (predetermined value), the DR solution is output as a positioning result in step S1320, and the continuously selected time of the DR solution is updated (incremented) in step S1321.

[2-3. Effect and the Like]

As described above, in the present embodiment, based on the previous coordinates of the moving body and information on the speed of the moving body, the current coordinates (estimated values) of the moving body are estimated, and interferometric wave positioning is executed based on the positioning data of base station 110 and the positioning data of positioning station 120 to calculate the current coordinates of the moving body as a fix solution or a float solution. In a case where the current coordinates of the moving body are calculated as a fix solution, the fix solution is calculated as the current coordinates of the moving body. This is because a fix solution is considered to be the most reliable. In a case where the current coordinates of the moving body are not calculated as a fix solution, an estimated value and a float solution are compared, and if the deviation between the estimated value and the float solution is large, the estimated value is output as the current coordinates of the moving body. In this case, it is considered that the reliability of the float solution is low (the reliability is higher for the estimated value than for the float solution). On the other hand, if the deviation between the estimated value and the float solution is small, the float solution is output as the current coordinates of the moving body. In this case, it is considered that the reliability of the float solution is high (the reliability is higher for the float solution than for the estimated value). In this way, in a case where the reliability of the float solution is low, the float solution is not output and the estimated value is output. As a result, it is possible to suppress the influence of the positioning error (jump) of the float solution.

In addition, it is also possible to combine the constituent elements described in the above Embodiments 1 and 2 to form a new embodiment.

Since the above-described embodiment is intended to exemplify the technique in the present disclosure, it is possible to make various changes, replacements, additions, omissions within the scope of claims or the equivalents thereof.

INDUSTRIAL APPLICABILITY

The present disclosure is applicable to a measurement system or the like using an interferometric positioning method or the like.

REFERENCE MARKS IN THE DRAWINGS

100 POSITIONING SYSTEM
110 BASE STATION
120 POSITIONING STATION
201 PROCESSOR
202 STORAGE
203 INPUT UNIT
204 OUTPUT UNIT
205 COMMUNICATOR
206 RECEPTION UNIT
210 BUS
301 PROCESSOR
302 STORAGE
303 INPUT UNIT
304 OUTPUT UNIT
305 COMMUNICATOR
306 RECEPTION UNIT
310 BUS
401 COORDINATE ESTIMATOR
402 COORDINATE CALCULATOR
403 COORDINATE OUTPUT UNIT
404 CONTINUOUS ESTIMATION DETERMINATION UNIT
405 THRESHOLD CHANGE UNIT
406 FIX SOLUTION CONTINUOUS DETERMINATION UNIT
407 RELIABILITY DETERMINATION UNIT

The invention claimed is:

1. A coordinate output method comprising:
   estimating current coordinates of a moving body based on previous coordinates of the moving body and information on a speed of the moving body;
   calculating the current coordinates of the moving body as either of a fix solution or a float solution by executing interferometric wave positioning based on positioning data of a base station installed at a predetermined point and positioning data of a positioning station placed on the moving body;
   outputting the current coordinates of the moving body calculated as the fix solution in a case where the current coordinates of the moving body are calculated as the fix solution;
   determining a time during which the current coordinates of the moving body have been calculated as the fix solution; and
   outputting the current coordinates of the moving body estimated from the information on the speed in a case where a time during which the current coordinates of the moving body have been calculated as the fix solution is equal to or more than a predetermined value and in a case where the current coordinates of the moving body are not calculated as the fix solution, the predetermined value being more than zero.

2. The coordinate output method of claim 1, further comprising:
   determining whether or not the current coordinates of the moving body estimated from the information on the speed have been continuously output for a predetermined time or more; and outputting the current coordinates of the moving body calculated as the float solution in a case where it is determined that the current coordinates of the moving body estimated from the information on the speed have been continuously output for a predetermined time and in a case where the current coordinates of the moving body are not calculated as the fix solution.

3. The coordinate output method of claim 1, further comprising:

determining reliability of a fix solution by the interferometric wave positioning; and in a case where the reliability of the fix solution obtained most recently is higher than a predetermined value, outputting the current coordinates of the moving body estimated from the information on the speed when a time during which the current coordinates of the moving body have been calculated as the fix solution is equal to or more than a predetermined value and when the current coordinates of the moving body are not calculated as the fix solution.

4. The coordinate output method of claim 1, further comprising:

determining reliability of a fix solution by the interferometric wave positioning; and in a case where the reliability of the fix solution obtained most recently is lower than a predetermined value, outputting the current coordinates of the moving body calculated as the float solution when a time during which the current coordinates of the moving body have been calculated as the fix solution is equal to or more than a predetermined value and when the current coordinates of the moving body are not calculated as the fix solution.

5. The coordinate output method of claim 1, further comprising:

outputting the current coordinates of the moving body calculated as the float solution in a case where the time during which the current coordinates of the moving body have been calculated as the fix solution is less than the predetermined value and in the case where the current coordinates of the moving body are not calculated as the fix solution.

6. A coordinate output device comprising:

a processor;

a storage; and an output unit, wherein the processor estimates current coordinates of a moving body based on previous coordinates of the moving body and information on a speed of the moving body, calculates the current coordinates of the moving body as either of a fix solution or a float solution by executing interferometric wave positioning based on positioning data of a base station installed at a predetermined point and positioning data of a positioning station placed on the moving body, outputs the current coordinates of the moving body calculated as the fix solution to the output unit in a case where the current coordinates of the moving body are calculated as the fix solution, determines a time during which the current coordinates of the moving body have been calculated as the fix solution to record the time in the storage, and outputs the current coordinates of the moving body estimated from the information on the speed to the output unit in a case where a time during which the current coordinates of the moving body have been calculated as the fix solution is equal to or more than a predetermined value and in a case where the current coordinates of the moving body are not calculated as the fix solution, the predetermined value being more than zero.

7. The coordinate output device of claim 6, wherein the processor determines whether or not the current coordinates of the moving body estimated from the information on the speed have been continuously output for a predetermined time or more; and outputs the current coordinates of the moving body calculated as the float solution to the output unit when it is determined that the current coordinates of the moving body estimated from the information on the speed have been continuously output for a predetermined time and when the current coordinates of the moving body are not calculated as the fix solution.

8. The coordinate output device of claim 6, wherein the processor determines reliability of a fix solution by the interferometric wave positioning, and in a case where the reliability of the fix solution obtained most recently is higher than a predetermined value, outputs the current coordinates of the moving body estimated from the information on the speed to the output unit when a time during which the current coordinates of the moving body have been calculated as the fix solution is equal to or more than a predetermined value and when the current coordinates of the moving body are not calculated as the fix solution.

9. The coordinate output device of claim 6, wherein the processor determines reliability of a fix solution by the interferometric wave positioning, and in a case where the reliability of the fix solution obtained most recently is lower than a predetermined value, outputs the current coordinates of the moving body calculated as the float solution to the output unit when a time during which the current coordinates of the moving body have been calculated as the fix solution is equal to or more than a predetermined value and when the current coordinates of the moving body are not calculated as the fix solution.

* * * * *